United States Patent
Distefano et al.

(10) Patent No.: US 11,975,305 B2
(45) Date of Patent: May 7, 2024

(54) SORBENT AND METHOD OF MAKING

(71) Applicant: CALGON CARBON CORPORATION, Moon Township, PA (US)

(72) Inventors: Rebecca Distefano, Oakdale, PA (US); Robert Vaughn, Bethel Park, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 313 days.

(21) Appl. No.: 15/894,431

(22) Filed: Feb. 12, 2018

(65) Prior Publication Data

US 2018/0229213 A1 Aug. 16, 2018

Related U.S. Application Data

(60) Provisional application No. 62/457,482, filed on Feb. 10, 2017.

(51) Int. Cl.
*B01J 20/06* (2006.01)
*B01J 20/20* (2006.01)
(Continued)

(52) U.S. Cl.
CPC ............. *B01J 20/20* (2013.01); *B01J 20/06* (2013.01); *B01J 20/28016* (2013.01);
(Continued)

(58) Field of Classification Search
CPC .. B01J 20/20; B01J 20/28016; B01J 20/3204; B01J 20/3236; B01J 20/3239;
(Continued)

(56) References Cited

U.S. PATENT DOCUMENTS 3,757,488 A 9/1973 Austin et al.
4,331,639 A 5/1982 Hass et al.
(Continued)

FOREIGN PATENT DOCUMENTS

EP 0433677 A1 6/1991
GB 1336241 11/1973
(Continued)

OTHER PUBLICATIONS

Halla et al. Zirconium-carbon hybrid sorbent for removal of fluoride from water: oxalic acid mediated Zr(IV) assembly and adsorption mechanism. Environ Sci Technol. Jan. 21, 2014; 48(2): 1166-1174. (Year: 2014).*

(Continued)

*Primary Examiner* — Benjamin L Lebron
(74) *Attorney, Agent, or Firm* — DLA Piper LLP (US)

(57) ABSTRACT

Sorbents are disclosed which exhibit less inherent leaching of arsenic and antimony than what is achieved by conventional sorbents. The inventive sorbents are formed by a process which includes the steps of contacting the porous sorbent particulate with a solution of a metal oxide or metal hydroxide, or a metal oxide or metal hydroxide precursor, and depositing metal oxides and hydroxides within the pores of the porous sorbent particulate. Purification of water is also described.

7 Claims, 4 Drawing Sheets

(51) Int. Cl.
| | |
|---|---|
| *B01J 20/28* | (2006.01) |
| *B01J 20/30* | (2006.01) |
| *B01J 20/32* | (2006.01) |
| *C02F 1/28* | (2023.01) |
| *C02F 1/50* | (2023.01) |
| *C02F 1/00* | (2023.01) |
| *C02F 1/32* | (2023.01) |
| *C02F 1/38* | (2023.01) |
| *C02F 1/52* | (2023.01) |
| *C02F 1/66* | (2023.01) |
| *C02F 1/76* | (2023.01) |
| *C02F 1/78* | (2023.01) |

(52) U.S. Cl.
CPC ....... *B01J 20/3078* (2013.01); *B01J 20/3204* (2013.01); *B01J 20/3236* (2013.01); *B01J 20/3293* (2013.01); *C02F 1/288* (2013.01); *C02F 1/50* (2013.01); *C02F 1/001* (2013.01); *C02F 1/281* (2013.01); *C02F 1/283* (2013.01); *C02F 1/32* (2013.01); *C02F 1/38* (2013.01); *C02F 1/52* (2013.01); *C02F 1/66* (2013.01); *C02F 1/76* (2013.01); *C02F 1/78* (2013.01); *C02F 2303/04* (2013.01)

(58) Field of Classification Search
CPC .. B01J 20/3078; B01J 20/06; B01J 20/28002; B01J 20/28011; B01J 20/28054; B01J 20/3293; C02F 1/288; C02F 1/283; C02F 1/001; C02F 1/281; C02F 1/32; C02F 1/38; C02F 1/50; C02F 1/52; C02F 1/66; C02F 1/76; C02F 1/78; C02F 2303/04
See application file for complete search history.

(56) References Cited

U.S. PATENT DOCUMENTS

| | | | |
|---|---|---|---|
| 4,474,853 A | 10/1984 | Watanabe | |
| 5,064,805 A | 11/1991 | Otowa | |
| 5,322,778 A | 6/1994 | Antrim et al. | |
| 5,348,755 A | 9/1994 | Roy | |
| 5,726,118 A | 3/1998 | Ivey et al. | |
| 5,754,002 A | 5/1998 | Haitko et al. | |
| 5,821,682 A | 10/1998 | Foust et al. | |
| 5,948,265 A * | 9/1999 | Wakamatsu | B01J 41/10 |
| | | | 210/683 |
| 6,186,939 B1 | 2/2001 | Forrester | |
| 6,599,856 B1 | 7/2003 | Uchino et al. | |
| 6,824,690 B1 | 11/2004 | Zhao et al. | |
| 6,827,874 B2 | 12/2004 | Souter et al. | |
| 6,848,374 B2 | 2/2005 | Srinivasachar et al. | |
| 7,780,765 B2 | 8/2010 | Srinivasachar et al. | |
| 7,858,061 B2 | 12/2010 | Varma et al. | |
| 7,862,725 B2 | 1/2011 | Mazyck et al. | |
| 7,879,136 B2 | 2/2011 | Mazyck | |
| 8,034,163 B1 | 10/2011 | Durham et al. | |
| 8,057,576 B1 | 11/2011 | Pollack | |
| 8,069,797 B2 | 12/2011 | Srinivasachar et al. | |
| 8,168,147 B2 | 5/2012 | Olson et al. | |
| 8,263,524 B1 | 9/2012 | Skandan et al. | |
| 9,302,246 B2 | 4/2016 | Vaughn et al. | |
| 2002/0110689 A1* | 8/2002 | Hu | B01J 20/20 |
| | | | 428/375 |
| 2003/0003289 A1* | 1/2003 | Py | B01J 20/20 |
| | | | 428/304.4 |
| 2003/0038084 A1* | 2/2003 | Mitchell | B01J 20/28085 |
| | | | 210/663 |
| 2003/0188663 A1 | 10/2003 | Barthel et al. | |
| 2004/0089608 A1 | 5/2004 | Vo | |
| 2005/0150835 A1 | 7/2005 | Vo | |
| 2008/0121142 A1 | 5/2008 | Comrie et al. | |
| 2009/0172998 A1 | 7/2009 | Harris et al. | |
| 2010/0178624 A1 | 7/2010 | Srinivasachar | |
| 2010/0307968 A1 | 12/2010 | Brigano et al. | |
| 2011/0030592 A1 | 2/2011 | Baldrey et al. | |
| 2011/0139726 A1 | 6/2011 | Jin et al. | |
| 2012/0048110 A1 | 3/2012 | Dawes et al. | |
| 2012/0100054 A1 | 4/2012 | Durham et al. | |
| 2013/0078169 A1 | 3/2013 | LaFlesh et al. | |
| 2013/0109562 A1 | 5/2013 | Wong et al. | |
| 2013/0284673 A1 | 10/2013 | Vaughn et al. | |
| 2013/0316898 A1 | 11/2013 | De Leij et al. | |
| 2013/0330257 A1 | 12/2013 | Tramposch | |
| 2014/0374655 A1 | 12/2014 | Mimna | |
| 2015/0050202 A1 | 2/2015 | Filippelli et al. | |

FOREIGN PATENT DOCUMENTS

| | | |
|---|---|---|
| JP | S58034039 A | 2/1983 |
| JP | S59076536 A | 5/1984 |
| JP | S62-286539 A | 12/1987 |
| JP | H10165826 A | 6/1998 |
| JP | H11019505 A | 1/1999 |
| JP | 2015-515443 A | 5/2015 |
| KR | 2004-0080043 A | 9/2004 |
| WO | 2004089501 A2 | 10/2004 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2014082076 A1 | 5/2014 |
| WO | 2014205200 A1 | 12/2014 |

OTHER PUBLICATIONS

International Search Report and Written Opinion for PCT/US2018/017833 dated Apr. 6, 2018.
Velazquez-Jimenez, LH et al., Zirconium-Carbon Hybrid Sorbent for Removal of Fluoride from Water: Oxalic Acid Mediated Zr(IV) Assembly and Adsorption Mechanism, Environ. Sci. Technol. Vol. 48, pp. 1166-1174; Dec. 20, 2013.
International Search Report and Written Opinion dated Oct. 28, 2014 in corresponding International Patent Application No. PCT/US2014/043158.
International Search Report and Written Opinion for PCT/US2016/033556 dated Aug. 26, 2016.
Raposo et al., Mercury Speciation in Flourescent Lamps by Thermal Release Analysis, Waste Manage (2003), 23(10):879-886.
Supplementary European Search Report in corresponding European Application No. 14813604.7 dated Jan. 30, 2017.
Encyclopedia of Chemical Engineering, vol. 15, Aquaculture-Natural Resins, compiled by Editorial Board of Encyclopedia of Chemical Engineering, Chemical Industry Press, p. 727 (Dec. 31, 1997).
First Chinese Office Action for Chinese Patent Application No. CN 201810303468.6 dated May 31, 2021 (with English Translation).

* cited by examiner

SORBENT AND METHOD OF MAKING

GOVERNMENT INTERESTS

Not applicable

PARTIES TO A JOINT RESEARCH AGREEMENT

Not applicable

INCORPORATION BY REFERENCE OF MATERIAL SUBMITTED ON A COMPACT DISC

Not applicable

BACKGROUND

This application claims priority to U.S. Provisional Application 62/457,482 which was filed on Feb. 10, 2017, the entirety of which is incorporated by reference.

Activated carbon and other sorbents are commonly used in the drinking water industry for the removal of a variety of contaminants including chlorinated and halogenated organic compounds, trihalomethanes, adsorbable organic halogens (AOX), volatile organic compounds (VOCs), odorous materials, colored contaminants, compounds for biological treatment systems, aromatics, pesticides, and the like. The purification is accomplished by direct contact of the contaminated water with the sorbent. During purification, the various contaminants which are present in the water are adsorbed within the porous structure of the adsorbent material, which traps and holds the contaminants for later desorption and/or disposal. Activated carbon is the most common sorbent that is employed for this purpose, because it is effective at absorbing a wide variety of contaminants.

While this process is effective at removing the most common contaminants present in drinking water sources most commercially available activated carbon sorbents contain low levels of undesirable metals such as arsenic, antimony, and aluminum in amounts of parts per million (ppm). The metals originate from the source of the activated carbon, whether from coal-based activated carbon that includes the metals, or from waste organic matter that was grown on contaminated land or exposed to contaminated air or water. When metals are present in the activated carbon, they can leach into drinking water in the form of soluble oxy-anions during the start-up of a liquid phase treatment process, at parts per billion (ppb) levels. While small, these amounts are still undesirable.

The prior art has attempted to solve the problem by subjecting the activated carbon sorbents to a separate post-activation acid washing step. While these methods can effectively reduce metals leaching, the results are inconsistent and vary with the composition of the activated carbon feedstock.

There is a need to prevent the contamination of drinking water by the various organic contaminants which are best removed by sorbent materials, while also avoiding ancillary contamination by the metals which are present in the sorbent materials. There is also a need for improvement in the processes and methods of treating the sorbent materials, particularly the activated carbon sorbent materials, which avoids the shortcomings of prior art post-activation acid washing processes.

SUMMARY OF THE INVENTION

The invention is directed to several embodiments to prevent the contamination of drinking water by various organic contaminants, as well as avoiding the contamination of the water by leaching of metals and other elements present in the sorbents used to treat the water. The invention is directed to embodiments of compositions of porous sorbent particulates, and methods of their preparation. The embodiments also encompass methods of water treatment using the porous sorbent particulates. The embodiments finally encompass apparatus that include the porous sorbent particulates. The embodiments are described below.

1. A composition, comprising:
   a porous sorbent particulate, and
   at least one of a metal oxide or metal hydroxide that is deposited within the pores of the porous sorbent particulate.
2. The composition of embodiment 1, wherein the porous sorbent particulate is activated carbon.
3. The composition of embodiment 1, wherein the metal oxide or metal hydroxide is zirconium oxide or zirconium hydroxide.
4. The composition of embodiment 1, wherein the amount of metal oxide or metal hydroxide is from about 0.1 wt. % to about 2 wt. %.
5. The composition of embodiment 1, wherein the amount of metal oxide or metal hydroxide is from about 0.1 wt. % to about 1 wt. %.
6. The composition of embodiment 1, further comprising a second porous sorbent particulate which is substantially free of metal oxide or metal hydroxide deposited within its pores.
7. The composition of embodiment 6, wherein the ratio of the porous sorbent particulate and the second porous sorbent particulate is about 5:1 to about 1:5.
8. The composition of embodiment 1, wherein the porous sorbent particulate is formed from bituminous coal, sub-bituminous coal, lignite coal, anthracite coal, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, carbonaceous material, or combinations thereof.
9. The composition of embodiment 1, wherein the contact pH of the composition is from about 5.5 to about 10.
10. The composition of embodiment 1, wherein the contact pH of the composition is from about 6.5 to about 8.5.
11. The composition of embodiment 1, wherein the composition is formed by the steps of:
    contacting a porous sorbent particulate with a solution, wherein the solution comprises at least one of a metal oxide or metal hydroxide or a metal oxide precursor or metal hydroxide precursor, and
    depositing at least one of a metal oxide or metal hydroxide within the pores of the porous sorbent particulate.
12. A method of making the composition of embodiment 1, comprising:
    contacting a porous sorbent particulate with a solution, wherein the solution comprises at least one of a metal oxide or metal hydroxide or a metal oxide precursor or metal hydroxide precursor, and
    depositing at least one of a metal oxide or metal hydroxide within the pores of the porous sorbent particulate.

13. The method of embodiment 12, wherein the porous sorbent particulate is activated carbon.
14. The method of embodiment 12, wherein the depositing comprises precipitating the metal oxide or metal hydroxide within the pores of the porous sorbent particulate.
15. The method of embodiment 12, wherein the metal oxide or metal hydroxide is zirconium oxide or zirconium hydroxide.
16. The method of embodiment 12, wherein the contacting step is performed by spraying, immersion, flowing, or combinations thereof.
17. The method of embodiment 12, wherein the metal oxide or metal hydroxide precursor is an acidic solution of zirconium oxide including but not limited to zirconyl chloride, zirconium sulfate, zirconium nitrate, zirconium phosphate or titanium, hafnium or iron analogs thereof.
18. The method of embodiment 12, wherein the porous sorbent particulate is further subjected to a step of thermal treatment which comprises heating the porous sorbent particulate.
19. The method of embodiment 12, wherein the porous sorbent particulate is further subjected to a step of thermal treatment which comprises heating the porous sorbent particulate to a temperature of about 23° C. to about 1200° C.
20. The method of embodiment 19, wherein the heating is to a temperature of about 450° C. to about 1000° C.
21. The method of embodiment 19, wherein the heating is to a temperature of about 50° C. to about 400° C.
22. The method of embodiment 19, wherein the step of thermal treatment is performed under air, a reducing atmosphere, an inert atmosphere, or combinations thereof
23. The method of embodiment 19, wherein the step of thermal treatment is performed at a temperature of about 450° C. to about 850° C. under an inert atmosphere.
24. A method for treating water, comprising:
contacting composition of embodiment 1 with water.
25. The method of embodiment 24, wherein the step of contacting is selected from the group consisting of flowing water over a bed that includes the composition of embodiment 1, introducing water into a filter that includes the composition of embodiment 1, introducing the composition of embodiment 1 into a container for holding water, and combinations thereof.
26. The method of embodiment 24, further comprising one or more steps selected from the group consisting of filtering the water, disinfecting the water, clarifying the water, adjusting a pH of the water, and combinations thereof
27. The method of embodiment 24, wherein the step of disinfecting the water is performed using irradiation with ultraviolet light, the addition of chlorine, the addition of ozone, the addition of chloramines, or combinations thereof.
28. The method of embodiment 24, wherein the step of clarifying is performed using cyclonic separation, a filter or membrane medium, coagulation, flocculation, aeration, or combinations thereof.
29. The method of embodiment 24, wherein the step of adjusting the pH of the water is performed by adding an acid, adding a base, adding diluting water, or combinations thereof
30. A water treatment apparatus comprising the composition of embodiment 1.

DESCRIPTION OF DRAWINGS

In the following detailed description, reference is made to the accompanying drawings, which form a part hereof. In the drawings, similar symbols typically identify similar components unless context dictates otherwise. The illustrative embodiments described in the detailed description, drawings, and claims are not meant to be limiting. Other embodiments may be utilized and other changes may be made without departing from the spirit or scope of the subject matter presented herein. It will be readily understood that the aspects of the present disclosure, as generally described herein and illustrated in the Figures, can be arranged, substituted, combined, separated, and designed in a wide variety of different configurations, all of which are explicitly contemplated herein.

DETAILED DESCRIPTION

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a filter" is a reference to "one or more filters" and equivalents thereof known to those skilled in the art, and so forth.

As used herein, the term "about" means plus or minus 10% of the numerical value of the number with which it is being used. Therefore, about 50% means in the range of 45%-55%.

As used here, the term "may" means that the later described element can either be present or that it can be excluded. For example, describing that the sorbent may include an additive means that the additive can be included, or that the additive can be excluded.

Some embodiments provide a water purification sorbent with low leaching of arsenic and antimony ions, where said sorbent is formed by depositing oxides and/or hydroxides on or within the sorbent. The term "depositing" or "deposition" in the context of the oxides and/or hydroxides on the sorbents of the invention means that the oxides and/or hydroxides are added to the surface and/or interior of the sorbent, by any process. Depositing or deposition processes may include but are not limited to processes where the oxides and/or hydroxides are added to the sorbent by precipitation, where dissolved metals, oxides, and hydroxides are impregnated in or on the sorbent. The oxides and/or hydroxides may be those of zirconium or any other compounds which are known to capture leaching arsenic, antimony, or other metals ions before they are carried away with the bulk water.

The oxides and/or hydroxides of zirconium capture any leaching arsenic and antimony ions before they are carried away with the bulk water. When blended with an untreated virgin sorbent, this sorbent has been shown to capture the majority of arsenic and antimony leached from the virgin carbon as well. The invention also provides a method for making said zirconium oxide and/or hydroxide impregnated product and blends thereof.

Embodiments of the invention are directed to sorbents for use in water purification and other processes where leaching of metals such as arsenic and antimony can be problematic, and further provides methods for making such sorbents. In some embodiments, the sorbent may be a metal oxide containing sorbent having a metal oxide such as, for example, zirconium oxide associated with a surface of the sorbent. Further embodiments include blends of metal oxide containing sorbents with untreated sorbents and filters, filter beds, and other apparatuses including metal oxide containing sorbents.

In various embodiments, the sorbent may be, for example, activated carbon, reactivated carbon, natural zeolite, synthetic zeolite, silica, silica gel, alumina, diatomaceous earths, and combinations thereof. In certain embodiments, the sorbent may be activated carbon. The activated carbon may be derived from any source and may have various sizes, shapes, and pore geometries. In various embodiments, the activated carbon may be prepared from any precursor carbonaceous material known in the art including, but not limited to bituminous coal, sub-bituminous coal, lignite coal, anthracite coal, peat, nut shells, pits, coconut, babassu nut, macadamia nut, dende nut, peach pit, cherry pit, olive pit, walnut shell, wood, bagasse, rice hulls, corn husks, wheat hulls, polymers, resins, petroleum pitches, and any other carbonaceous material or combinations thereof. Additionally, the carbonaceous material may be derived from activated carbons produced from various precursors that have been in-use and subsequently reactivated and/or regenerated.

The sorbent may have a mean particle diameter (MPD) of about 4 mm or less, and in certain embodiments, the sorbent may have a MPD about 4 mm to about 0.1 mm, about 4.5 mm to about 1.0 mm, about 4.0 μm to about 1.5 mm, about 3.5 mm to about 2.0 μm, or any individual value or range encompassed by these values. Similarly, the pore geometry of the sorbent may vary among embodiments, and the sorbent may have a distribution of pores including macropores (greater than 50 nm diameter), mesopores (2 nm to 50 nm diameter), and micropores (less than 2 nm diameter). These and other pore geometries fall under the more general terms of "pores" or "porous" or "porosity" which is described throughout this specification.

The pore distribution may affect the types of materials that can be adsorbed by the sorbent. Thus, the sorbent of certain embodiments may have a wide pore distribution indicating that the pores of each activated carbon particle have various sizes, and these are capable of adsorbing a wide range of compounds that correspond to the various pore geometries contained within the activated carbon. In other embodiments, the pore geometries are selected to selectively adsorb certain compounds which are expected to be found in the water to be treated.

The sorbent and pore geometries may be selected to adsorb compounds which are deleterious and which are commonly found in drinking water. These compounds include various organic compounds that cause taste and odor and/or color problems, synthetic organic chemicals from upstream discharges or runoff, organic precursor compounds that react with disinfectants, the by-products of disinfection, and natural organic compounds that have little toxicological importance. The sorbent composition and its pore geometries should be selected not only to account for the compounds for which it is desired to remove, but also to account for other compounds which may nonetheless be adsorbed, as these tend to compete for adsorption sites with the compounds which are to be adsorbed.

In some embodiments, the activated carbon may have a moisture content of from about 0.1% to about 35%, about 2% to about 30%, about 4% to about 35% or any individual value or range encompassed by these ranges. In some embodiments, the moisture content may be the result of residual moisture from an impregnation process. For example, after impregnating, the activated carbon may be dried to a particular moisture level.

The amount of metal oxide or metal hydroxide associated with a surface of the sorbent may vary among embodiments. For example in some embodiments, the sorbent may contain about 0.1 wt. % to about 10 wt. % metal oxide or metal hydroxide, and in other embodiments, the sorbent may contain about 0.2 wt. % to about 7 wt. %, about 0.3 wt. % to about 5 wt. % or about 0.5 to about 2.5 wt. % metal oxide or metal hydroxide or any range or individual amount encompassed by these ranges. In certain embodiments, the metal oxide or metal hydroxide containing sorbent may have about 1 wt. % metal oxide associated with a surface of the sorbent. In such embodiments, the metal oxide or metal hydroxide may be attached or adhered or otherwise deposited to the surface of the sorbent by an electrostatic interaction, Van der Waals forces, adsorption, or deposition and in particular embodiments, may be within the pores of the sorbent.

As used herein, the term "contact pH" means the pH water measured after immersion of a sample in about 100 mL of the water for a period of time. The period of time can be from about 5 minutes to about 30 minutes. In some embodiments, the period of time for measuring the contact pH is 5 minutes; in some embodiments, the period of time is 15 minutes; in some embodiments, the period of time is 30 minutes. In some embodiments, sorbent may have a contact pH of from about 4.5 to about 10.0, or from about 5.5 to about 10.0, or from about 6.5 to about 10.0. The sorbent may also have a contact pH of from about 4.5 to 9.0, or from about 5.5 to about 9.0, or from about 6.5 to about 9.0. The sorbent may further have a contact pH of from about 4.5 to about 8.0, from about 5.5 to about 8.0, or from about 6.5 to about 8.0. For all of these, the values can be measured after 5, 15, or 30 minutes of immersion. The contact pH, as measured after 5, 10, or 30 minutes of immersion can be about 4.5, about 5.0, about 5.5, about 6.0, about 6.5, about 7.0, about 7.5, about 8.0, about 8.5, about 9.0, about 9.5, about 10.0, about 10.5, or about 11.0, or any range between any two of those values. The sorbent produced in the manner of the invention may exhibit a ten-fold reduction in arsenic, antimony, and aluminum leaching when compared to conventional sorbents that have been neutralized after acid washing and which exhibit a contact pH of about 9 to about 11.

The sorbents of the invention may exhibit reduced leaching of metals and other transition elements such as arsenic, antimony, and aluminum when immersed in water. Thus, the sorbents of various embodiments described above may be useful for use in water purification systems, and in particular, water purification systems that are used for purification of drinking water. The treatments of the invention are also useful because they enable the selection of a wider variety of sorbent feedstocks without the possibility of leaching metals into water that is to be treated.

Additional embodiments are directed to methods for preparing the activated carbons described above. In some embodiments, the method may include the step of impregnating a sorbent with a metal oxide such as, for example, any acidic solution of zirconium oxide, titanium oxide, hafnium oxide or iron oxide including but not limited to zirconyl chloride, zirconium sulfate, zirconium nitrate, zirconium phosphate, titanium chloride, titanium sulfate, titanium nitrate, titanium phosphate, hafnium chloride, hafnium sulfate, hafnium nitrate, hafnium phosphate, iron chloride, iron sulfate, iron nitrate, iron phosphate, or analogs or combinations thereof. For example, methods include impregnating activated carbon with zirconium oxide by contacting the activated carbon with a dilute solution of zirconyl chloride. Without wishing to be bound by theory, the zirconium oxide or other metal oxide may precipitate from this mixture into the pores of the activated carbon because the solution is inherently acidic and the pores of the sorbent, particularly activated carbon, are inherently basic.

In some embodiments, the impregnated sorbent which has deposited metal oxides or hydroxides may be subjected to a thermal treatment such as drying and/or calcining by heating. In some embodiments, the thermal treatment may be performed at about ambient temperature, for example, about 23° C. to about 1200° C. The thermal treatment may be performed at about 50° C., about 80° C., about 100° C., about 150° C., about 200° C., about 250° C., about 300° C., 350° C., about 400° C., about 450° C., about 500° C., about 550° C., about 600° C., about 650° C., about 700° C., about 750° C., about 800° C., about 850° C., about 900° C., about 950° C., about 1000° C., about 1050° C., about 1100° C., about 1150° C., about 1200° C., or any range made of any two of those values. The above temperature ranges are contemplated as producing effective activity in metal oxide and metal hydroxide impregnated sorbents, particularly activated carbon with included oxides and hydroxides of zirconium.

The thermal treatment using the above temperatures and temperature ranges may be performed under air, or it may be performed under an inert atmosphere, or it may be performed under a reducing atmosphere, or it may be performed under combinations of those. The inert atmosphere may be nitrogen, or any inert gas such as argon, helium, neon, krypton, xenon, and radon. Reducing gases or atmospheres may include gases such as hydrogen, carbon monoxide, and combinations thereof. It is noted that at higher temperatures, inert gases and/or reducing atmospheres are contemplated to avoid oxidation of the underlying sorbent, particularly if that sorbent is carbon. In some embodiments, the temperature at which inert and/or reducing atmospheres are employed is about 400° C., about 450° C., about 500° C., about 550° C., about 600° C., about 650° C., about 700° C., about 750° C., about 800° C., or any range that is formed from the combination of those with an upper bound of about 800° C., about 850° C., about 900° C., about 950° C., about 1000° C., about 1050° C., about 1100° C., about 1150° C., or about 1200° C. For instance, reducing and/or inert gases may be used in temperature ranges from about 400° C. to about 1200° C. or about 500° C. to about 1200° C. or about 600° C. to about 1200° C.

In some embodiments, high temperature calcination occurs above 600° C. in either an inert or reducing atmosphere. Such embodiments are not limited to a particular temperature and can be carried out at any temperature from about 80° C. to about 800° C. Effective activity has been shown in activated carbon that has been treated at about 80° C., about 150° C., about 250° C., about 300° C., about 400° C., about 500° C., about 600° C., about 700° C., and about 800° C. The activity may also be produced by treatment in ranges that are formed from any two of these endpoints, such as about 400° C. to about 800° C. or about 80° C. to about 400° C.

In some embodiments, the methods may include a step of activating or reactivating a sorbent material, such as a carbonaceous sorbent material, before impregnating the sorbent. Activation can be carried out by any activation means known in the art including steam and chemical activation processes, and combinations of those processes. For example, in some embodiments, the a sorbent that is formed of a carbonaceous material may be exposed to an oxidizing agent such as carbon dioxide, oxygen, or steam at temperatures above 250° C., for example, about 600° C. to about 1200° C. In other embodiments, the carbonaceous material may be calcined at temperatures of from about 600° C. to about 900° C., in an inert atmosphere with gases like argon or nitrogen. In still other embodiments, the carbonaceous material may be combined with an acid, strong base, or a salt such as phosphoric acid, potassium hydroxide, sodium hydroxide, calcium chloride, and zinc chloride and then subjected to temperatures of about 450° C. to about 900° C.

In certain embodiments, the methods may include a step of washing the activated carbon in an acid solution prior to impregnation of the sorbent. Acid washing may be carried out using any acid known in the art including, for example, hydrochloric acid, sulfuric acid, nitric acid, acetic acid, citric acid, maleic acid, fumaric acid, mono-basic organic acid, di-basic organic acid, formic acid, and the like, and can be carried out in a solution of about 1% to about 3% acid. Typically, washing in acid is carried out in a vessel. The activated carbon may be washed for any amount of time. For example, in some embodiments, washing can be carried out from about 1 hour to about 16 hours, about 2 hours to about 10 hours, about 3 hours to about 8 hours, or any individual time or time period encompassed by these ranges. In certain embodiments, the step of acid washing is performed prior to the step or steps of oxide and/or hydroxide deposition on the sorbent.

In some embodiments, the method may include the step of neutralizing the pH of the acid washed activated carbon prior to impregnation of the sorbent. In such embodiments, neutralization can be carried out by contacting the acid washed activated carbon with a basic solution including a base such as, for example, sodium hydroxide, sodium carbonate, sodium bicarbonate, potassium hydroxide, potassium carbonate, potassium bicarbonate, and the like and combinations thereof. In particular embodiments, contacting can be carried out by immersing the activated carbon in the basic solution, and in other embodiments, contacting may include spraying or flowing the solution onto or over the acid washed activated carbon. In some embodiments, neutralization may be carried out by water washing the acid washed activated carbon, and water washing can be carried out by immersing the activated carbon in water or spraying or flowing water over the activated carbon. In some embodiments, the methods may exclude the step of neutralizing.

In further embodiments, the methods may include rinsing the activated carbon in water after neutralization prior to impregnation of the sorbent. Rinsing can be carried out by any means including, for example, immersion, spraying, or flowing water over the neutralized activated carbon. In various embodiments, rinsing may be carried out until the rinse water has a pH of about 1.0 to about 3.0. The pH of the rinse water can be determined by measuring the pH after the water has contacted the activated carbon and, in some embodiments, has reached an ion concentration equilibrium with the neutralized activated carbon.

After washing, the method may include the steps of drying the activated carbon. For example, in some embodiments, the activated carbon can be removed from the vessel and dried under atmospheric conditions in air at either ambient or elevated temperature. In other embodiments, the activated carbon can be dried by heating, and in some embodiments, drying may be carried out under vacuum. In certain embodiments, the activated carbon may be dried completely to a residual moisture level of about 0.1% to about 1%. In other embodiments, the activated carbon may be dried to a residual moisture level of about 1% to about 20%, about 2% to about 17%, about 4% to about 15% or any individual value or range encompassed by these ranges. The activated carbon prepared by these methods will have a contact pH of about 6.5 to about 8.5, about 6.0 to about 8.0, about 5.5 to about 7.5, about 5.0 to about 7.0, or any individual value or range encompassed by these values. Contact pH can be determined by contacting the dried activated carbon with purified and de-ionized water and after an amount of time, for example, about 5 minutes to about 10 minutes, determining the pH of the water. For comparison, virgin activated carbon or activated carbon that has been acid washed and rinsed until the rinse water is about neutral (i.e., pH of about 7.0) will typically have a contact pH of greater than about 9.0, for example, 8.0 to about 11.0. The activated carbons described above and prepared by the method described above have a contact pH that is significantly lower than the contact pH of virgin activated carbon or activated carbon that has been washed to a neutral rinse water pH, yet the activated carbon of such embodiments provides significantly reduced leaching of arsenic, antimony, or other metals that can contaminate water.

In some embodiments, the methods may further include the step of mixing the metal oxide containing sorbent with untreated sorbent. For example, in certain embodiments, activated carbon prepared by the method described above can be combined with activate carbon that is untreated, or that has been acid washed, neutralized, and/or rinsed, but does not contain metal oxides. The resulting composition, therefore, includes a mixture of metal oxide containing activated carbon and non-metal oxide containing activated carbon. Without wishing to be bound by theory, compositions including a mixture may exhibit substantially the same reduced metal leaching as compositions including only metal oxide containing activated carbon.

The mixtures may include any ratio of metal oxide containing activated carbon to non-metal oxide containing activated carbon. For example, in some embodiments, the ratio of metal oxide containing activated carbon to non-metal oxide containing activated carbon may be 1:1, 2:1, 3:1, 4:1, 5:1, and the like or 1:2, 1:3, 1:4, 1:5, and the like. Thus, the mixtures of various embodiments may be about 100% metal oxide containing activated carbon to about 10% metal oxide containing activated carbon or less, and in some embodiments, the mixtures may be about 90% to about 20%, about 80% to about 25%, about 75% to about 30%, or about 50% metal oxide containing activated carbon or any percentage or range encompassed by these ranges.

Additional embodiments are directed to filters and methods for purifying water using the metal oxide containing activated carbons described above. Such embodiments are not limited to particular types of filters. For example, in some embodiments, the filter may be water filter for consumer use, and in other embodiments, the filter may be a commercial water filter for use at, for example, an industrial or municipal water treatment plant.

The consumer filters of various embodiments may have any design and may at least include a housing, including a compartment configured to hold granulated activated carbon and allow water to flow over the activated carbon. Such filters may include various additional components such as, for example, screens or other means for holding the activated carbon in the compartment or additional purification devices such as filtration membranes and the like. In some embodiments, the housing may include various components necessary to allow the filter to be integrated into a device such as a pitcher or bottle device in which water flows from one compartment to another and passes through the filter during transfer, a device that attaches to a water line or faucet that cause water to pass through the filter before being expelled from the faucet or otherwise delivered to a water dispensing device. In particular, the filter may include an inlet port for introducing water into the filter and an outlet port for dispensing the filtered or treated water from the filter. In some embodiments, the filter may include a removable connecting means to connect to a water source such as a sink pipe, hose, tube fittings, faucet, water fountain and the like at the inlet port.

In some embodiments, the filter may include a filter housing having an elongated envelope composed of an inert plastic material such as polyethylene, polypropylene, polyvinylchloride, polytetrafluoroethylene, or any combination thereof disposed within the filter housing for retaining the low contact pH activated carbon or mixture of low contact pH activated carbon and neutral activated carbon. The filter housing and the envelope can be spaced from one another, and in some embodiments, a particulate filter such as, for example, filter paper may be disposed within the space to retain dust associated with the activated carbon. In particular embodiments, additional adsorbents, such as, carbon cloth may be disposed within the space. In some embodiments, the filter may include a perforated plate, slotted grate, mesh grill, screen, or other means for securing the envelope within the housing while allowing free flow of fluid through the housing.

Commercial or municipal water treatment devices may include larger filter devices or tanks designed to attach to large high flow water pipes that provide beds positioned to receive water from a natural source during treatment. Such devices are well known in the art and the metal oxide containing activated carbon can be included in any such device. In various embodiments, beds or tanks including granular activated carbon can be positioned at various places along the flow path of the treatment plant, and granular metal oxide containing activated carbon as described above can be used by any one or all of these beds or tanks. In certain embodiments, the water may be contacted with powdered activated carbon at one or more place in the treatment path, and in such embodiments, the powdered activated carbon may be metal oxide containing activated carbon. As discussed above, in such treatment devices, the granulated or powdered metal oxide containing activated carbon can be metal oxide containing activated carbon and can be used alone or in a mixture of metal oxide containing activated carbon and non-metal oxide containing activated carbon. The treatment devices and facilities may include various additional tanks and components, such as, for example, equalization basins, clarifiers, biological treatment basins or tanks, sand filtration devices, membrane filtration devices, and the like and combinations thereof.

Further embodiments are directed to methods for purifying water using the metal oxide containing activated carbon described above. The step of contacting can be carried out by any means including, for example, flowing water over a bed of metal oxide containing activated carbon or mixture of metal oxide containing activated carbon and non-metal oxide containing activated carbon, introducing water onto a filter including metal oxide containing activated carbon or a mixture of metal oxide containing activated carbon and non-metal oxide containing activated carbon, introducing activated carbon having metal oxide containing activated carbon or mixture of metal oxide containing activated carbon and non-metal oxide containing into a container for holding water, and the like, and in some embodiments, such mean for contacting can be combined. In other embodiments, the method may include additional steps. For example, in some embodiments, methods for purifying water may include the steps of filtering the water using, for example, a screen or sand filter before, after, or both before and after contacting with metal oxide containing activated carbon or mixture of metal oxide containing activated carbon and non-metal oxide containing to remove particulates. In further embodiments, the methods may include the step of disinfecting the water to remove biological contaminants such as bacteria or other microorganisms, and in some embodiments, the methods may include the step of introducing a disinfectant into the water. In still further embodiments, the methods may include the step of clarifying the water, adjusting the pH of the water, and the like and combinations thereof.

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

The objective of this process is to impregnate activated carbon with zirconium oxide in order to reduce or eliminate metals leaching. As detailed above, when acidic zirconyl chloride solution is added to inherently basic activated carbon, it is theorized that zirconium oxide is precipitated into the pores of the activated carbon. To ensure that the precipitated activated carbon is evenly distributed throughout the pores of an entire mass of activated carbon, the solution of zirconyl chloride is applied in a dilute form, with a moisture content of about 10-30%. As used herein, the term "zirconyl chloride" includes but is not limited to any of the various permutations of zirconium oxides and hydroxides which are water soluble derivatives of zirconium. Zirconyl chloride is known by those of skill in the art to have the formula $[Zr_4(OH)_8(H_2O)_{16}]Cl_8(H_2O)_{12}$ or is sometimes written as $ZrOCl_2*8H_2O$ or referred to as zirconyl chloride octahydrate. Zirconyl chloride is typically produced by hydrolysis of zirconium tetrachloride and/or treating zirconium oxide with hydrochloric acid.

As shown in Table 1 and Table 2, the process of applying zirconyl chloride in dilute form is effective at reducing metals leaching, regardless of the moisture content being from 0% (dry) all the way through 30%. In addition, it was also observed that freshly prepared activated carbon which was treated with high moisture zirconyl chloride solution shows no leaching of zirconium. This supports the theory that the acidic zirconyl chloride, on contact with the basic activated carbon, precipitates into a water-insoluble zirconium oxide which is held within the pores of the activated carbon. It was further observed that the drying or calcination procedure is not critical and has demonstrate to be effective when conducted at 80° C., 150° C., 250° C., 300° C., and 800° C. Activated carbon produced by this method resulted in low levels of arsenic, antimony, and aluminum for liquid phase applications as demonstrated in both static and dynamic leach tests.

In a static leaching test, the sorbent was submerged in deionized water for a period of time ranging from 1 to 24 hours, followed by filtration to remove the sorbent and analysis of the extract water for metals by methods such as inductively-coupled plasma (ICP) or ICP-Mass Spectrometry (ICP-MS).

In a dynamic leaching test, the sorbent was loaded into a column and contacted with an extraction water containing 50±5 ppm total dissolved solids, 0.5±0.05 ppm free chlorine and having neutral pH. Eight to ten bed volumes of extraction water is pumped through the sorbent then held static for 24±1 hours. After the required hold time, the column effluent was sampled, the procedure was repeated two more times to generate a composite water samples. The water samples were then analyzed for metals by ICP or ICP-MS.

TABLE 1

Static Leaching Test

| | Final Moisture | Arsenic (ppb) | Antimony (ppb) | Aluminum (ppb) | Zirconium (ppb) |
|---|---|---|---|---|---|
| Starting activated carbon (no treatment) | | 67 | 61 | 380 | — |
| Same activated carbon, but $ZrO_2$-impregnated by new method | 30% | 2.6 | 0.36 | 22 | <2.6 |
| | 12.4% | 3.2 | 0.02 | 15 | <2.6 |
| | Dry | 2.6 | 0.38 | 25 | <2.6 |

TABLE 2

Dynamic Leaching Test

| | Final Moisture | Arsenic (ppb) | Antimony (ppb) | Aluminum (ppb) | Zirconium (ppb) |
|---|---|---|---|---|---|
| Starting activated carbon (no treatment) | | 85 | 70 | 450 | — |
| Same activated carbon, but $ZrO_2$-impregnated by new method | 30% | <0.29 | 0.43 | 20 | <2.6 |
| | 12.4% | <0.29 | 0.20 | 20 | <2.6 |
| | Dry | <0.29 | 0.38 | 28 | <2.6 |

Figure 1:
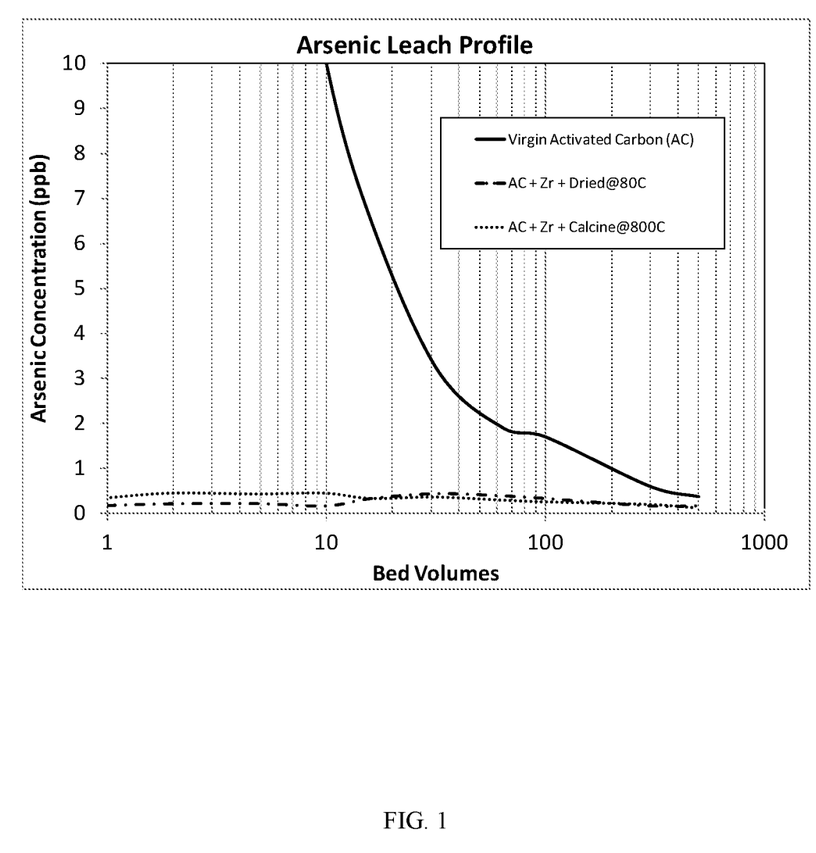
FIG. 1 is a graph showing the metal leaching profile for arsenic for virgin activated carbon and activated carbon impregnated with $ZrO_2$ that has been dried or calcined.
Figure 2:
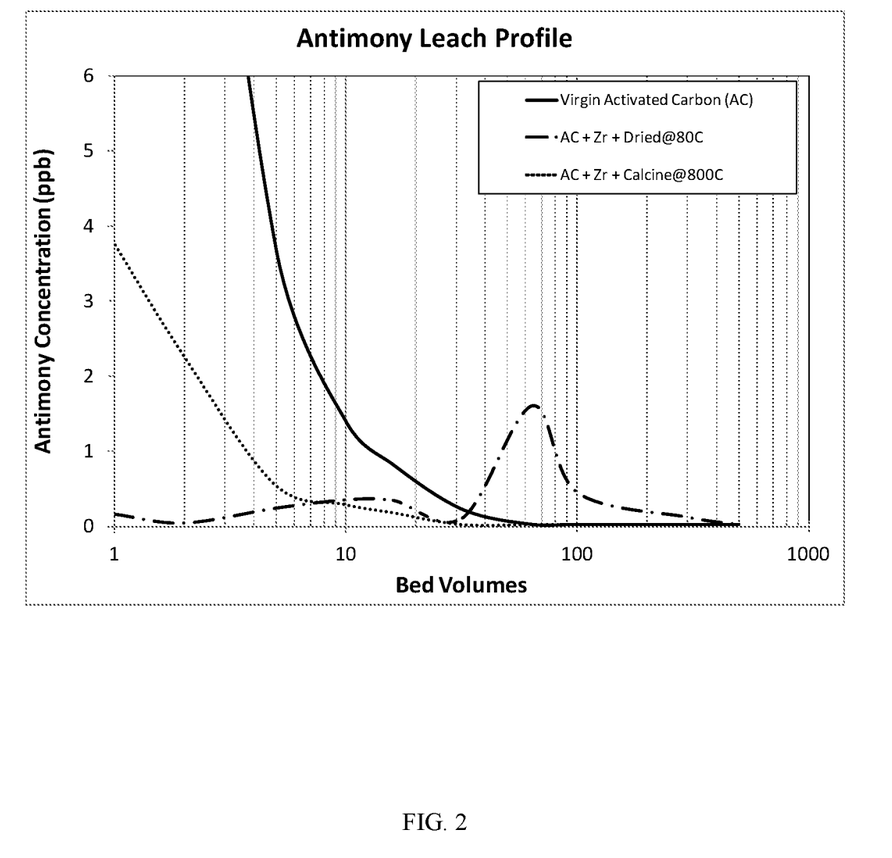
FIG. 2 is a graph showing the metal leaching profile for antimony for virgin activated carbon and activated carbon impregnated with $ZrO_2$ that has been dried or calcined.
Figure 3:
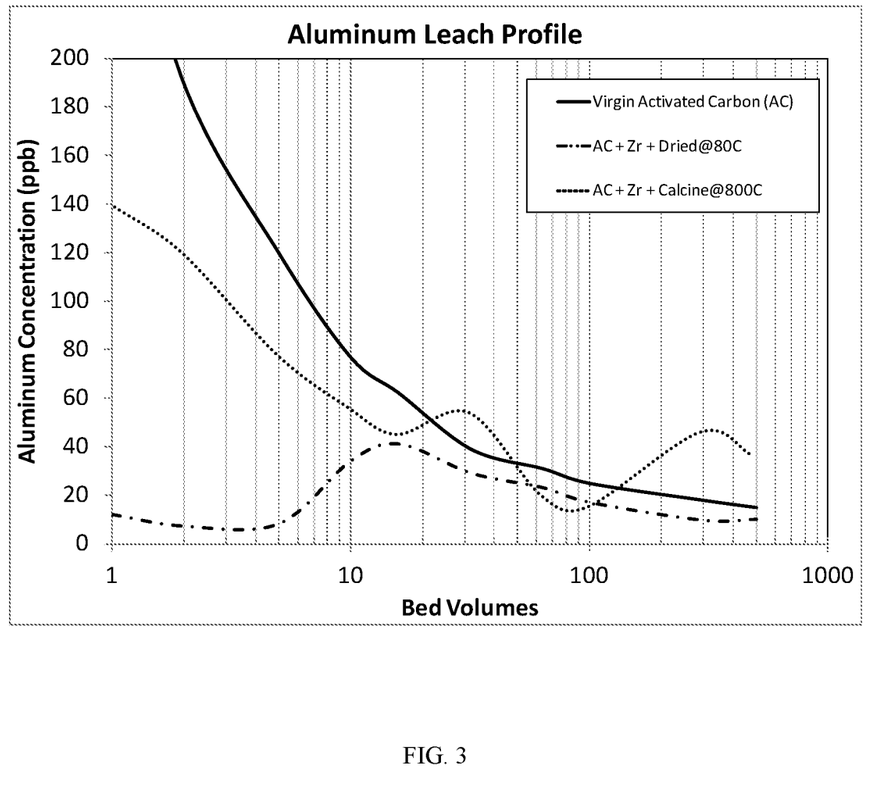
FIG. 3 is a graph showing the metal leaching profile for aluminum for virgin activated carbon and activated carbon impregnated with $ZrO_2$ that has been dried or calcined.

FIG. 1-3 show metals leaching profiles for accelerated column tests simulating the first 500 bed volumes of operation.

The zirconium content of the sorbent following the impregnation process was determined by Proton Induced X-ray Emission (PIXE) analysis. As is appreciated by those of skill in the art, PIXE analysis does not quantify the full amount of zirconium because PIXE is a surface analysis technique and does not report zirconium that is embedded within the sorbent. Table 3 shows data for the tested value by PIXE and the theoretical value based on the amount of chemical added to the sorbent. The value determined by PIXE was approximately 50% of the theoretical value. While not accurate relative to the theoretical value, the difference between the two levels of $ZrO_2$ impregnation is accurate when compared to the feedstock.

TABLE 3

| | Zr (theoretical calculated, ppm) | Zr (measured with PIXE, ppm) |
|---|---|---|
| Starting activated carbon (no treatment) | | 20.1 |
| Same activated carbon, but $ZrO_2$-impregnated to target 0.5 wt % by new method | 2778 | 1470 |
| Same activated carbon, but $ZrO_2$-impregnated to target 1.0 wt % by new method | 5556 | 2590 |

Example 2

Blending a virgin activated carbon with a $ZrO_2$ impregnated activated carbon decreased metals leaching by an amount significantly greater than that predicted by a mathematical average. Table 4 shows data for a virgin activated carbon feedstock, a 1 wt. % $ZrO_2$ impregnated activated carbon, and a 50:50 blend of the two. The activated carbons were blended by riffling. The data demonstrates that precipitated zirconium oxide is not only effective on the impregnated carbon but acts on metals in the process stream that may leach from other sources. In addition to reducing metals leaching, the addition of acidic zirconyl chloride followed by drying lowers the pH of the activated carbon to near neutral. This is seen in both in the contact pH of the activated carbon and in the initial bed volumes of column testing, as shown by Table 5 below.

TABLE 4

Dynamic Leaching Test

| | Arsenic (ppb) | Antimony (ppb) | Aluminum (ppb) |
|---|---|---|---|
| Starting activated carbon (no treatment) | 85 | 70 | 450 |
| Same activated carbon, but $ZrO_2$-impregnated to target 1.0 wt % by new method | <0.21 | 0.07 | <7.2 |
| 50/50 Blend of starting activated carbon and same activated carbon $ZrO_2$-impregnated to target 1.0 wt % by new method | 1.7 | 2.6 | 190 |

TABLE 5

| | Final Moisture | Contact pH |
|---|---|---|
| Starting activated carbon (no treatment) | | 9.5 |
| Same activated carbon, but $ZrO_2$-impregnated to target 1.0 wt % by new method | 30% | 7.0 |
| | 12.4% | 6.8 |
| | Dry | 7.5 |

Figure 4:
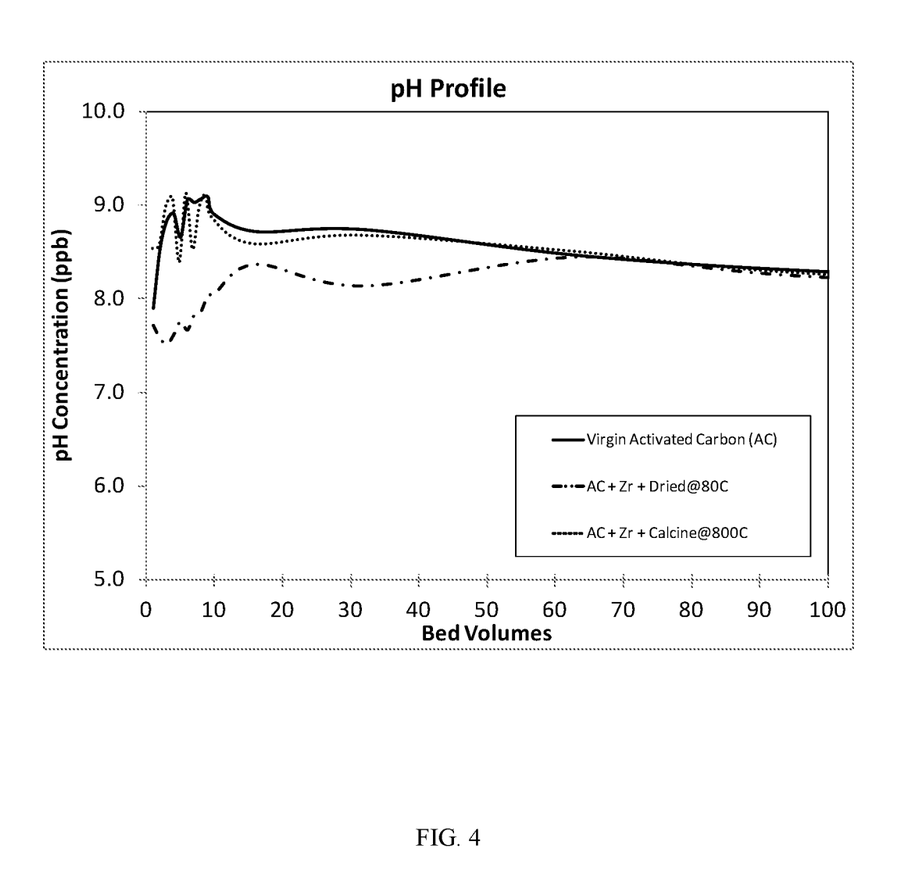
FIG. 4 is a graph showing the pH profile for virgin activated carbon and activated carbon impregnated with $ZrO_2$ that has been dried or calcined.

As further evidence that the neutralization of the activated carbon was due to the addition of the zirconyl chloride, it was observed that when the activated carbon is calcined, residual hydrochloric acid is driven off and the pH effect is lost. This process is illustrated by FIG. 4.

Example 3

The impregnation of virgin activated carbon with $ZrO_2$ as described herein was more effective at reducing leachable metals than a dry mixture of the virgin carbon and the chemical zirconium oxide. To demonstrate this, two pairs of $ZrO_2$-containing activated carbon samples were prepared. Within each pair, one sample was an admixture of dry $ZrO_2$ powder and activated carbon, while the other sample was impregnated with zirconyl chloride to target the same $ZrO_2$ loading on a dry basis. The two pairs represent intentionally different final zirconium contents, 0.5 wt % and 1.0 wt % (as $ZrO_2$). Table 6 shows the results of the dynamic leaching test for virgin activated carbon feedstock, as well as the two pairs of treated activated carbon feedstocks described above in Examples 1 and 2. The data in Table 6 shows that the treatment with zirconia in the manner described resulted in a 800-3400% advantage in suppressing the base activated carbon's tendency to leach arsenic or antimony relative to activated carbon that was not treated.

TABLE 6

| | | Concentration in Effluent From Dynamic Leach Test | |
|---|---|---|---|
| | $ZrO_2$ (wt. %) | As (ppb) | Sb (ppb) |
| Starting Activated Carbon (no treatment) | <0.001 | 69 | 52 |
| Admixture of $ZrO_2$ and carbon | 0.50 | 67 | |
| $ZrO_2$-impregnated carbon by new method | 0.50 | 1.2 | 2.1 |

TABLE 6-continued

| | ZrO$_2$ (wt. %) | Concentration in Effluent From Dynamic Leach Test | |
| --- | --- | --- | --- |
| | | As (ppb) | Sb (ppb) |
| Relative Improvement, Leaching Suppression | | 3400% | 1000% |
| Admixture of ZrO$_2$ and Carbon | 1.0 | 60 | 46 |
| ZrO$_2$-impregnated carbon by new method | 1.0 | 0.26 | 0.74 |
| Relative Improvement, Leaching Suppression | 1.0 | 800% | 900% |

What is claimed is:

1. A composition having reduced leaching of one or more of arsenic, antimony, and aluminum compared to sorbents that have been neutralized after acid washing and which have a contact pH of about 9 to about 11, the composition comprising:
an activated carbon porous sorbent particulate formed from bituminous coal, sub-bituminous coal, lignite coal, anthracite coal, peat, nut shells, pits, coconut, babassu nut, macadamia nut, dende nut, peach pit, cherry pit, olive pit, walnut shell, wood, bagasse, rice hulls, corn husks, wheat hulls, or combinations thereof, at least one of zirconium oxide or zirconium hydroxide that is deposited within the pores of the activated carbon porous sorbent particulate, and
a second activated carbon porous sorbent particulate which is substantially free of metal oxide or metal hydroxide deposited within its pores,
wherein the contact pH of the composition is from about 5.5 to about 8.0, and
wherein the composition has not been neutralized after acid washing.

2. The composition of claim 1, wherein the amount of zirconium oxide or zirconium hydroxide is from about 0.1 wt. % to about 2 wt. %.

3. The composition of claim 1, wherein the amount of zirconium oxide or zirconium hydroxide from about 0.1 wt. % to about 1 wt. %.

4. The composition of claim 1, wherein the ratio of the activated carbon porous sorbent particulate and the second activated carbon porous sorbent particulate is about 5:1 to about 1:5.

5. The composition of claim 1, wherein the contact pH of the composition is from about 6.5 to about 8.0.

6. A water treatment apparatus comprising the composition of claim 1.

7. The composition of claim 1, wherein the activated carbon porous sorbent particulate has been thermally treated at a temperature from about 23° C. to about 400° C.

* * * * *